(12) United States Patent
Kuenzi et al.

(10) Patent No.: US 11,386,736 B2
(45) Date of Patent: *Jul. 12, 2022

(54) SYSTEM AND METHOD FOR MONITORING AN ACCESS KEY FROM A KEY-BOX

(71) Applicant: Carrier Corporation, Palm Beach Gardens, FL (US)

(72) Inventors: Adam Kuenzi, Silverton, OR (US); Pirammanayagam Nallaperumal, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,271

(22) Filed: Oct. 5, 2020

(65) Prior Publication Data

US 2021/0090378 A1   Mar. 25, 2021

Related U.S. Application Data

(63) Continuation of application No. 16/146,245, filed on Sep. 28, 2018, now Pat. No. 10,796,519.

(30) Foreign Application Priority Data

Mar. 26, 2018   (IN) .............................. 201811011031

(51) Int. Cl.
*G07C 9/28* (2020.01)
*G07C 9/00* (2020.01)
(Continued)

(52) U.S. Cl.
CPC ............ *G07C 9/28* (2020.01); *E05B 19/0005* (2013.01); *G07C 9/00571* (2013.01);
(Continued)

(58) Field of Classification Search
CPC ....... G07C 9/00571; G07C 9/27; G07F 17/12; E05B 19/0005; E05B 63/0065
See application file for complete search history.

(56) References Cited

U.S. PATENT DOCUMENTS 7,061,367 B2   6/2006   Mosgrove et al.
7,336,181 B2   2/2008   Nowak et al.
(Continued)

FOREIGN PATENT DOCUMENTS

CN   203290347 U   11/2013
CN   102521904 B   12/2013
(Continued)

OTHER PUBLICATIONS

English Translation of CN106154214A.
(Continued)

*Primary Examiner* — Daniell L Negron
(74) *Attorney, Agent, or Firm* — Cantor Colburn LLP

(57) ABSTRACT

Disclosed is a system for monitoring a location of a key relative to a key-box, configured to perform: (i) providing access to the key by: communicating over a personal area network with a first mobile-device for the first user as the first user approaches the key-box in an attempt to obtain the key, obtaining first credentials from the first mobile-device, determining whether the first credentials are valid or invalid, when the first credentials are valid: putting the key-box in an unlocked configuration, (ii) tracking a location of the key by: communicating over the personal area network with: the key and/or mobile-device to determine whether the key is being returned to the key-box, wherein upon a determination by the key-box or the mobile-device that the key is not being returned, an alert is provided by the mobile-device to the first user.

17 Claims, 5 Drawing Sheets

(51) Int. Cl.
*G07F 17/12* (2006.01)
*H04W 64/00* (2009.01)
*E05B 19/00* (2006.01)
*G07C 9/27* (2020.01)

(52) U.S. Cl.
CPC .......... *G07C 9/00896* (2013.01); *G07C 9/27* (2020.01); *G07F 17/12* (2013.01); *H04W 64/003* (2013.01); *G07C 2009/00936* (2013.01)

(56) References Cited

U.S. PATENT DOCUMENTS

| | | | |
|---|---|---|---|
| 7,366,522 | B2 | 4/2008 | Thomas |
| 8,188,837 | B2 | 5/2012 | Patenaude et al. |
| 8,451,088 | B2 | 5/2013 | Fisher |
| 8,624,727 | B2 | 1/2014 | Saigh et al. |
| 8,643,510 | B2 | 2/2014 | Schrabler et al. |
| 8,798,593 | B2 | 8/2014 | Haney |
| 8,831,632 | B2 | 9/2014 | Laws et al. |
| 9,196,139 | B2 | 11/2015 | Gutierrez et al. |
| 9,333,945 | B2 | 3/2016 | Lin |
| 9,330,541 | B1 | 5/2016 | Ortiz |
| 9,355,551 | B2 | 5/2016 | Nixon |
| 9,357,348 | B2 | 5/2016 | Evans et al. |
| 9,460,480 | B2 | 10/2016 | Woodard et al. |
| 9,478,083 | B2 | 10/2016 | Fisher |
| 9,704,319 | B2 | 7/2017 | Desinor, Jr. |
| 9,715,815 | B2 | 7/2017 | Verma |
| 9,743,375 | B2 | 8/2017 | Anesi et al. |
| 9,854,385 | B2 | 12/2017 | Oliver et al. |
| 10,102,749 | B1 | 10/2018 | Wagner |
| 10,219,107 | B2 | 2/2019 | Lévêque et al. |
| 10,403,069 | B2 | 9/2019 | Desinor, Jr. |
| 10,745,943 | B1 | 8/2020 | Jonak et al. |
| 2007/0090921 | A1 | 4/2007 | Fisher |
| 2007/0260883 | A1 | 11/2007 | Giobbi et al. |
| 2011/0159917 | A1 | 6/2011 | Johnson |
| 2012/0303743 | A1 | 11/2012 | Stonefield et al. |
| 2013/0117176 | A1 | 5/2013 | Oler |
| 2014/0062700 | A1 | 3/2014 | Heine et al. |
| 2014/0132412 | A1 | 5/2014 | Deco et al. |
| 2014/0213301 | A1 | 7/2014 | Evans et al. |
| 2015/0109116 | A1 | 4/2015 | Grimm et al. |
| 2015/0302416 | A1 | 10/2015 | Decelles et al. |
| 2016/0227377 | A1 | 8/2016 | Kuenzi et al. |
| 2017/0024800 | A1 | 1/2017 | Shah |
| 2017/0241165 | A1 | 8/2017 | McGinn et al. |
| 2018/0190056 | A1* | 7/2018 | Desinor, Jr. ......... E05B 19/0005 |
| 2019/0295355 | A1 | 9/2019 | Santhosh et al. |
| 2021/0047864 | A1 | 2/2021 | Kuenzi et al. |
| 2021/0258088 | A1 | 8/2021 | Kanteti et al. |

FOREIGN PATENT DOCUMENTS

| | | |
|---|---|---|
| CN | 203391730 U | 1/2014 |
| CN | 203894833 U | 10/2014 |
| CN | 102852390 B | 8/2015 |
| CN | 105957215 A | 9/2016 |
| CN | 106154214 A | 11/2016 |
| CN | 104346946 B | 9/2017 |
| CN | 105735826 B | 12/2017 |
| DE | 102011053242 A1 | 3/2013 |
| EP | 3107072 A1 | 12/2016 |
| EP | 3647128 A1 | 5/2020 |
| WO | 2007128011 A1 | 11/2007 |
| WO | 2014003717 A1 | 1/2014 |
| WO | 2017183690 A1 | 10/2017 |
| WO | 2020081265 A1 | 4/2020 |

OTHER PUBLICATIONS

Beacon Bluetooth Low Energy BLE 4.0 Reminder Tracker Anti Theft Lost Alarm Locator Bluetooth Beacon; Retrieved on Feb. 6, 2018. Retrieved from the internet;URL: http://https://axaet.en.alibaba.com/product/60324553668-220961191/iBeacon_Bluetooth_Low_Energy_BLE_4_0_Reminder_Tracker_Anti_Theft_Lost_alarm_locator_bluetooth_beacon.html; 12 pages.

International Search Report and Written Opinion; Application No. PCT/US2019/054786; dated Dec. 19, 2019; 14 pages.

Magid, L. "Use Your Phone To Find Your Keys and Vice Versa", Forbes, May 3, 2012, Retrieved Aug. 30, 2018 from https://www.forbes.com/sites/larrymagid/2012/05/03/useyourphonetofindyourkeysandviceversa/#2ec98ad717f1, 4 Pages.

* cited by examiner

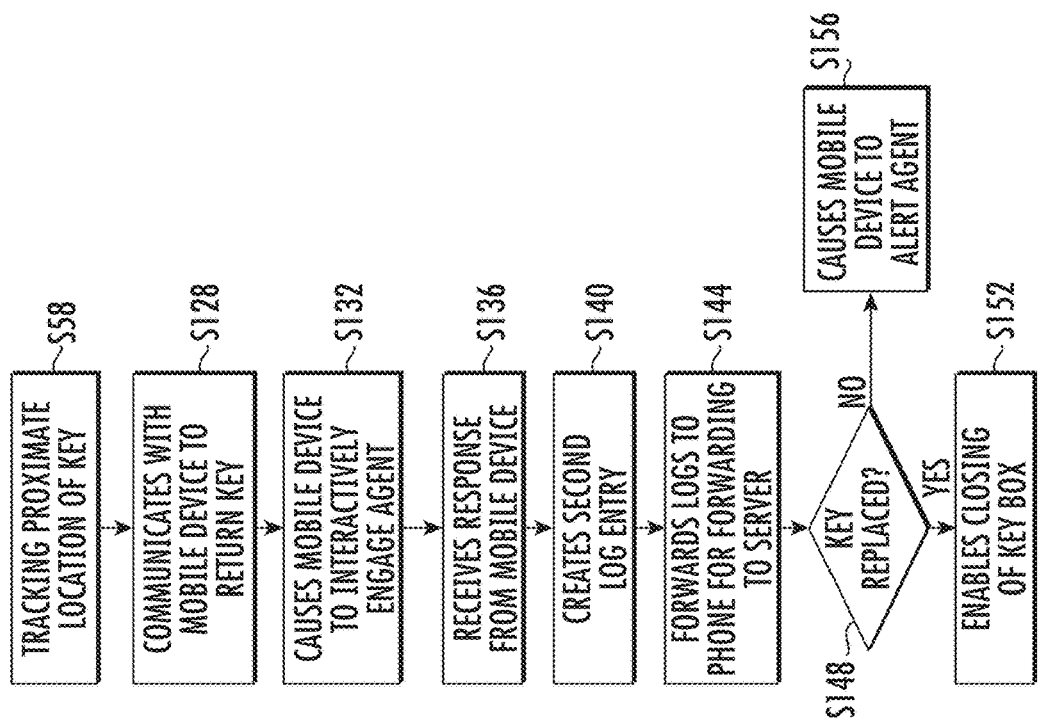
FIG. 5
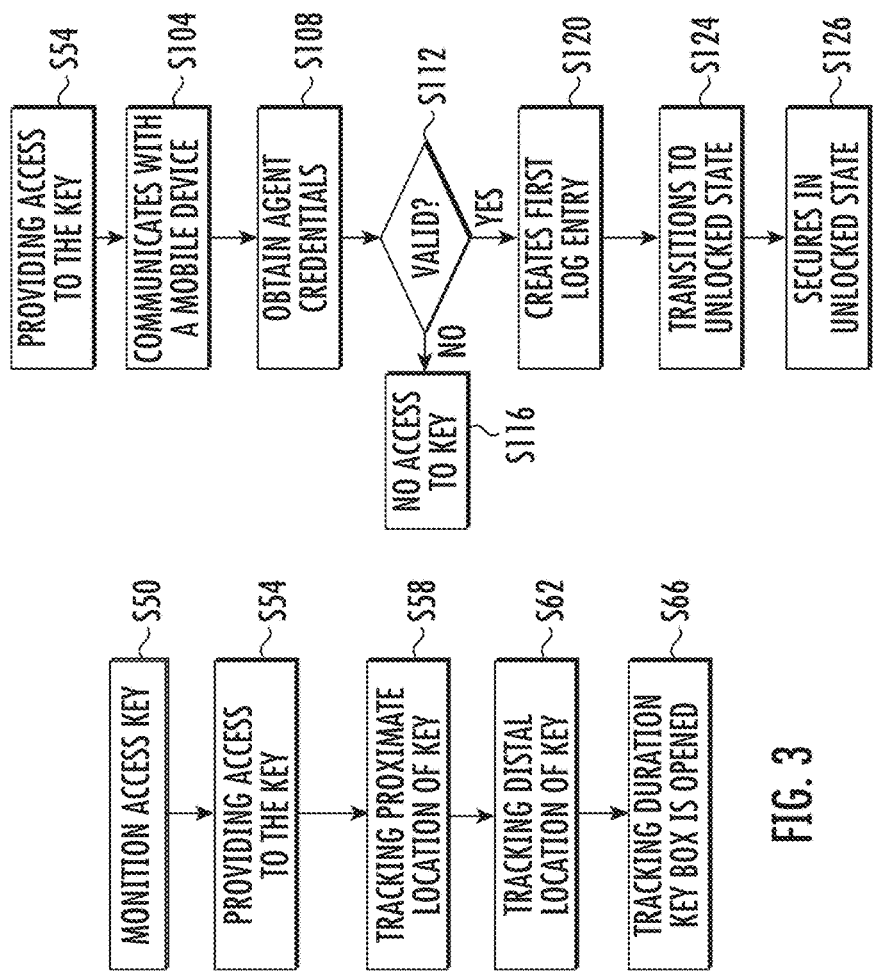
FIG. 4
FIG. 3

SYSTEM AND METHOD FOR MONITORING AN ACCESS KEY FROM A KEY-BOX

CROSS REFERENCE TO RELATED APPLICATIONS

This application is a Continuation of U.S. application Ser. No. 16/146,245, filed Sep. 28, 2018, which claims the benefit of an earlier filing date from Indian Provisional Application Serial No. 201811011031 filed Mar. 26, 2018, the entire disclosure of which is incorporated herein by reference.

BACKGROUND

The disclosed embodiments relate to key tracking and more specifically to monitoring an access from a key-box.

A real estate agent may show an available property to a potential buyer by opening a lock box or a key container, removing an access key chain or an access key card, and accessing the available property. The access key may be small and the agent may forget to replace the access keys in the key-box, or the access key may become misplaced before leaving the property.

BRIEF DESCRIPTION

Disclosed is a system for monitoring a location of an access key relative to a key-box, the key-box including an electronic controller, wherein the controller is configured to perform steps comprising: a first step of providing access to the key within the key-box while the key-box is in a locked configuration, the first step including: communicating over a personal area network with a first mobile-device for the first user as the first user approaches the key-box in an attempt to obtain the key, obtaining first credentials from the first mobile-device, determining whether the first credentials are valid or invalid, when the first credentials are valid: putting the key-box in an unlocked configuration, a second step of tracking a location of the key to determine whether the key is being returned to the key-box, the second step including: communicating over the personal area network with: the key and/or mobile-device to determine whether the key is being returned to the key-box, wherein upon a determination by the key-box or the mobile-device that the key is not being returned, an alert is provided by the mobile-device to the first user.

In addition to one or more of the above features and steps, or as an alternative, in the first step: when the first credentials are valid the controller performs the step of securing the key-box in the unlocked configuration, and the second step comprises tracking a proximate location of the key and further comprises: communicating over the personal area network with the first mobile-device as the first user approaches the key-box in an attempt to replace the key, wherein when communicating with the first mobile-device, the second step includes: transmitting first instructions the first mobile-device to query the first user whether the key is being returned to the key-box, and receiving from mobile-device a response to the query, determining whether the response obtained in the second process indicates that the key is being returned to the key-box, and when the response indicates the key is not being returned to the key-box: instructing the mobile-device to provide a first alert to the first user, and when the response indicates the key is being returned to the key-box the controller performs the step of releasing the key-box from the unlocked configuration, so that the key-box may be locked by the first user.

In addition to one or more of the above features and steps, or as an alternative, the controller performs a third step of tracking a distal location of the key relative to the key-box, the third step including: communicating with mobile-device after the first process; determining a travel distance from the key-box to the mobile-device; comparing the travel distance to a threshold distance; determining if the travel distance is greater than the threshold distance, wherein when the travel distance is greater than the threshold distance: instructing the mobile-device to provide a second alert to the first user.

In addition to one or more of the above features and steps, or as an alternative, the first step includes recording in a first data-log a first log entry indicative of the first user being provided with access to the key, the second step includes recording in the data-log a second log entry indicative of the response to the query from the first user, and transmitting to the mobile-device the data-log, for transferring the data-log over to a central server.

In addition to one or more of the above features and steps, or as an alternative, the controller performs a fourth step of tracking a duration the key-box is opened to identify a potentially a misplaced key, the fourth step including: tracking a time that the key is removed from the key-box after the first step, comparing the tracked time against a threshold time, wherein when the tracked time is greater than the threshold time: recording in the first data-log a third log entry indicative of the first user being having the key for a time greater than the threshold time, communicating over the personal area network with a second mobile-device for a second user as the second user approaches the key-box in an attempt to obtain the key, obtaining second credentials from the second mobile-device, determining whether the second credentials are valid, transmitting to the second mobile-device the data-log, for transferring the data-log over the cellular network to the central server.

In addition to one or more of the above features and steps, or as an alternative, the personal area network applies Bluetooth Low Energy protocols and/or radio frequency identification protocols.

In addition to one or more of the above features and steps, or as an alternative, the mobile-device is a mobile phone and in the second process the mobile phone transfers the data-log to the central server over a cellular network.

In addition to one or more of the above features and steps, or as an alternative, in the first step, responsive to receiving the first instructions, the mobile phone presents on a screen for the mobile phone (i) a query of whether the first user is returning the key to the key-box, and (ii) a plurality of engagable radial buttons to receive as input from the first user an indication of whether or not the key is being replaced in the key-box.

In addition to one or more of the above features and steps, or as an alternative, in the first step the first alert is one or more of a first email, a first Short Message Service text, a first audio alert, a first video alert and a first vibratory alert.

In addition to one or more of the above features and steps, or as an alternative, in the third step the second alert is one or more of a second email, a second Short Message Service text, a second audio alert, a second video alert and a second vibratory alert.

Further disclosed is a method for monitoring a location of an access key relative to a key-box, including one or more of the above features and or steps.

Further disclosed is a system for monitoring a location of an access key relative to a key-box, wherein the key-box includes a controller that transmits over a personal area network periodic advertisements of whether the key is in the key-box, the system including a mobile-device configured to perform steps comprising: a first step of monitoring over the personal area network for advertisements, a second step of receiving over the personal area network the periodic advertisements from the key-box, a third step of determining whether the periodic advertisements are indicative of the key being within the key-box or removed from the key-box; wherein when the periodic advertisements are indicative of the key being within the key-box, the mobile-device is configured to return to the first step, and when the periodic advertisements are indicative of the key being removed the key-box, the mobile-device is configured to perform steps comprising: a fourth step of monitoring elapsed time against a predetermined time period, a fifth step of monitoring a distance from the key-box against a predetermined distance, a sixth step of continuing to monitor for transmitted periodic advertisements over the personal area network from the key-box and determining whether the periodic advertisements are indicative of the key being within the key-box or removed from the key-box, wherein when the periodic advertisements are indicative of the key being within the key-box, the mobile-device is configured to discontinue monitoring elapsed time and monitoring the distance to the key-box and to return to the first step, and when either of the elapsed time becomes greater than the predetermined time period or the distance from the key-box becomes greater than the predetermined distance the mobile-device is configured to provide an alert.

In addition to one or more of the above features and steps, or as an alternative, following providing the alert, the mobile-device is configured to: monitor for transmitted periodic advertisements over the personal area network from the key-box and determine whether the periodic advertisements are indicative of the key being within the key-box or removed from the key-box, wherein when the periodic advertisements are indicative of the key being within the key-box, discontinuing the alert and returning to the first step.

BRIEF DESCRIPTION OF THE DRAWINGS

The following descriptions should not be considered limiting in any way. With reference to the accompanying drawings, like elements are numbered alike:

FIG. 3 illustrates a process according to embodiment of the disclosure;

FIG. 4 illustrates a process according to an embodiment of the disclosure;

FIG. 5 illustrates a process according to an embodiment of the disclosure;

DETAILED DESCRIPTION

A detailed description of one or more embodiments of the disclosed apparatus and method are presented herein by way of exemplification and not limitation with reference to the Figures.

Figure 1:
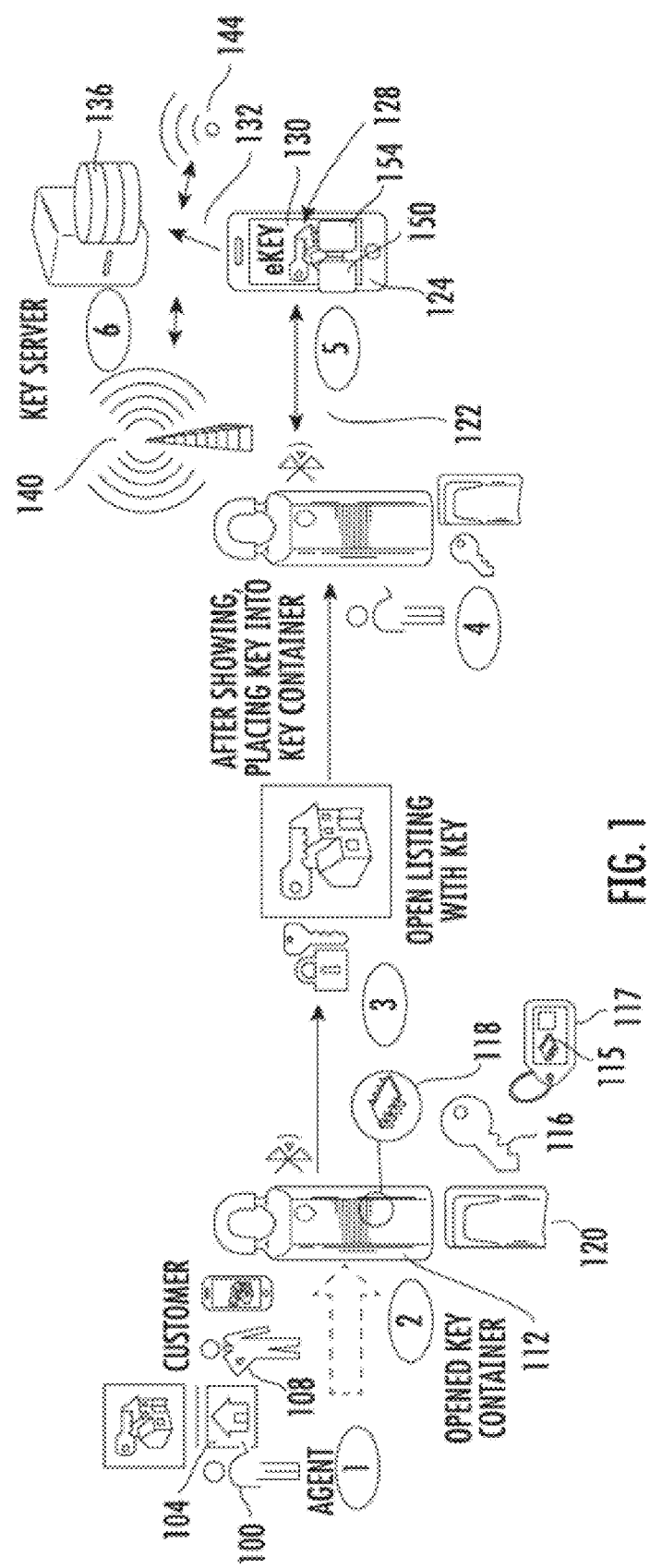
FIG. 1 illustrates features of an embodiment of the disclosure.
Figure 2:
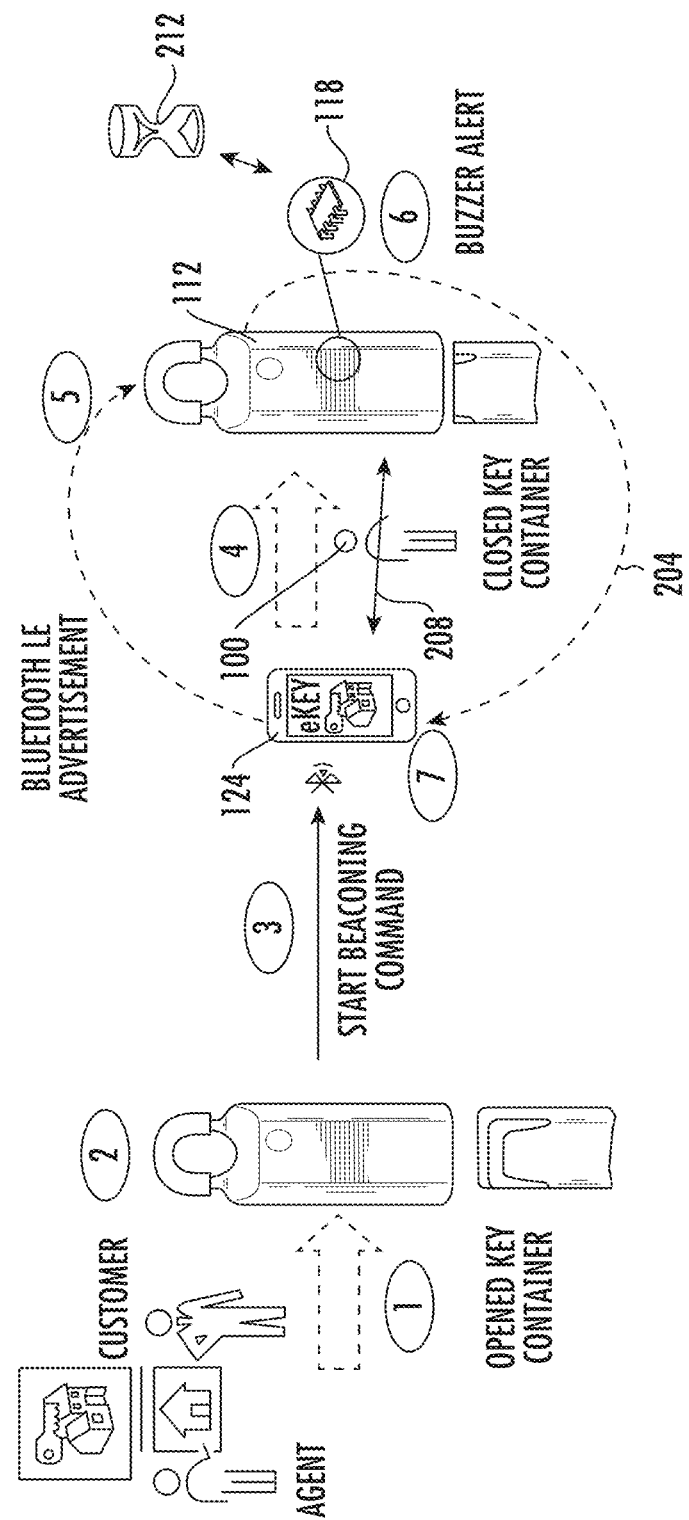
FIG. 2 illustrates features of an embodiment of the disclosure.

FIGS. 1 and 2 illustrate environments in which the disclosed embodiments may be practiced. A user in the embodiments may be real estate agent 100 who may intend to access an available property 104 to display to a customer, that is, a potential buyer 108. A key-box 112 may be disposed proximate the property in which an access key 116 is maintained. The key-box may include an electronic controller 118 to control electro-mechanical functions of the key-box and to provide the key-box with telecommunication capabilities. Access to the key may be through a key container 120 in the key-box. The key container may be capable of being secured in an opened state by electro-mechanical control from the controller, during which time a key 116 may be removed and replaced in the key-box. In a locked or closed state the key 116 in the key container 120 may be locked within the key-box 112.

The key-box may be a first smart device that may communicate over a personal area network (PAN) 122 with a mobile-device 124, which may be a mobile phone that may be a second smart device and which may be in possession of the agent 100. PAN protocols may include, for example, NFC (near field communication), BlueTooth Low Energy (BLTE) or ZIGBEE. The mobile-device 124 may be equipped with an App 128, available from an App Store, providing program level communications between the key-box 112 and the mobile-device 124. The agent 100 may interact with the App 128 via a screen 130 on the mobile-device 124. In addition, using the APP 128, the mobile-device 124 may communicate over the Internet 132 with a central server 136. Moreover, the mobile-device may use a cellular network 140 for access to the Internet or the mobile-device may access the Internet by, for example, a connection over Wi-Fi 144 (trademark of the Wi-Fi Alliance).

Referring to FIG. 3, at step S50 the controller 118 may monitor a location of the access key 116. Under this step, the controller may perform a first step S54 of providing access to the key 116 within the key-box 112 while the key-box 112 is in the locked configuration, which is illustrated in greater detail in FIGS. 1 and 4. The controller may also perform a second step S58 of tracking a proximate, or near field, location of the key 116 to determine if the key is being returned to the key-box 112 by the agent, which is discussed in greater detail in FIGS. 1 and 5. The controller may also perform a third step S62 of tracking a distal, or far field, location of the key 116 relative to the key-box to prevent the agent 100 from potentially leaving with the key, which is illustrated in greater detail in FIGS. 2 and 6. The controller may also perform a fourth step S66 of tracking a duration the key-box is opened to identify if the key 116 is potentially lost by the agent, which is illustrated in greater detail in FIGS. 2 and 7.

Referring to FIGS. 1 and 4, as indicated, at step S54 the controller may execute the first step of providing access to the key 116 within the key-box 112 while the key-box 112 is in the locked configuration. Initially the key 116 may be in the key-box 112, the key-box 112 may be in a closed state. At step S104 the key-box controller 118 may communicate with the mobile-device 124 of the agent (using the App 128) when the agent seeks to obtain the access key 116. These communications occur, for example, using BTLE. At step S108 the controller 118 may obtain credentials from the mobile-device 124 which may represent the agent 100 credentials for accessing the key.

At step S112 the controller 118 may determine whether the credentials are valid. If the credentials are not valid then at step S116 the controller may not grant access to the key 116 by, for example, not unlocking the key-box 112. If the credentials are valid then at step S120 the controller 118 may record a first audit log entry in an audit log stored on the controller 118, where the first entry may include the credentials or at least an identifier of the agent 100 and may indicate that access to the key 116 is being provided. At step S124 the controller 118 using electromechanical controls may configure the key-box 112 to the unlocked or opened state to provide access to the key container 120 and hence the key 116. At step S126 the controller may secure the key-box in the unlocked state.

Referring to FIGS. 1 and 5, as indicated, at step S58 the controller may execute the second step of tracking a proximate, or near field, location of the key 116 to determine if the key is being returned to the key-box 112 by the agent 100. After showing the property to the customer 108, at step S128 the controller 118 may again communicate with the mobile-device 124 of the agent 100 as the agent attempts to return or replace the key 116. At step S132 the controller may instruct the mobile-device 124 to interactively engage the agent to determine whether the key 116 has been replaced in the key-box. For example the mobile-device may provide a visual query on the screen 130, responsive to which the mobile-device may receive a "YES" or "NO" using respective first and second radio buttons 150, 154.

At step S136 the controller 118 may receive data from the mobile-device 124 indicative of the response from the agent 100. At step S140 the controller 118 may record a second audit log entry indicator of the response of the agent 100. At step S144 the controller may transfer the audit log data to the mobile-device 124, which may transfer the audit data to the central server 136. The audit data may serve as a digital check to ensure that the agent 100 left the key 116 in the key-box. At step S148 the controller may determine whether the response from the agent indicated that the key 116 was being replaced in the box.

If the response was "YES" then at step S152 the controller may enable closing of the key-box by the agent, for example, by releasing the key-box from the unlocked state and allowing the key container 120 to latch into the key-box 112. If the response was "NO" then at step S156 the controller may again communicate with the mobile-device and cause the mobile-device to interactively engage the agent with an alert indicating that the key must be replaced.

On one embodiment, in addition to or instead of asking the agent at step S132 and S136 whether the key is being returned, the key-box 112 may directly detect whether the key 116 is being returned. For example, the key 116 could have a Bluetooth chip 115 on a key ring 117 (FIG. 1) that advertises periodically. Based on proximity, for example, whether the key 116 is inside the key-box 112, outside the key-box 112 but close in proximity to the key-box 112, or relatively far away from the key-box 112, the key-box 112 may determine whether and which key 116 is in the key-box 112. If other keys have similar technology implements, the key-box 112 could determine when a key belonging in another key-box is accidently placed in the key-box 112. When a key belonging in a different key-box is placed in the key-box 112, an alert may be sent to the agent which requests that the agent confirm the correct keys are being positioned in the key-box.

Alternatively, the key 116 could have a radio frequency identification (RFID) chip that may be on the same board as the Bluetooth chip 115 and that may be read by an RFID reader upon insertion of the key 116 into the key-box 112. The RFID reader may be part of the controller 118 within the key-box 112. Yet alternatively the key could have a chemical signature, a visual identifier (barcode, QR code, etc. that is scanned by the box when it is returned). Moreover, the sensor in the key-box could be a mechanical tamper spring, or a magnetic sensor such as a magnetic reed proximity switch. In one embodiment the presence or absence of the key container 120 can be determined by the key-box 112 to determine if the key 116 is present or absent respectively.

In one embodiment the key-box 112 determines at any time from one or more above disclosed features and/or steps that the key 116 has been returned. In such an instance, procedures disclosed herein which may subsequently create an alert may be aborted. This may avoid the controller 118 or mobile-device 124 from creating undue alerts.

Figure 6:
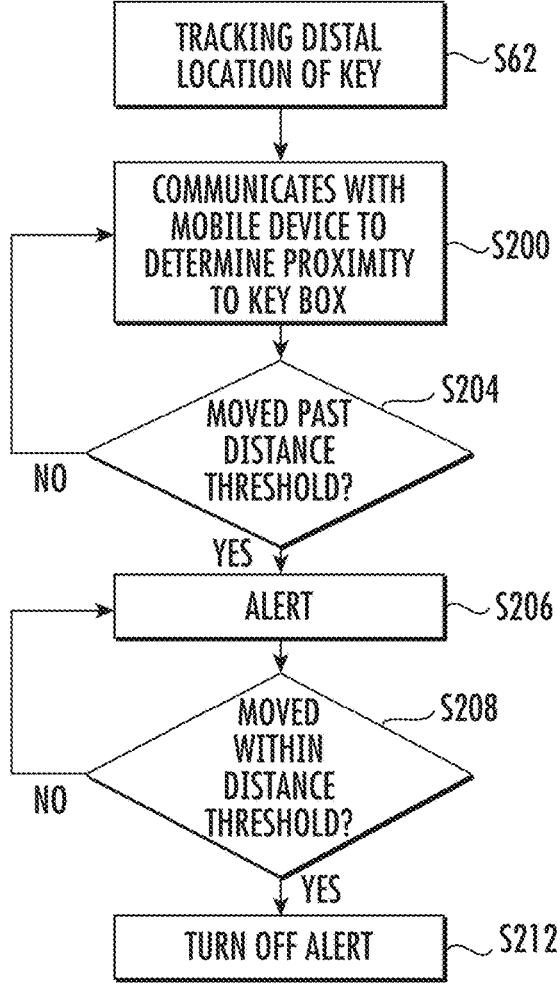
FIGS. 6 and 6A illustrate a process according to an embodiment of the disclosure.

Turning to FIGS. 1, 3 and 6, and as indicated, at step S62 the controller may execute a third step of tracking a distal, or far field, location of the key 116 relative to the key-box 112 to prevent the agent from potentially leaving with the key. At step S200 the controller 118 may periodically communicate 204 (FIG. 2) with the mobile-device 124 to determine a proximity 208 of the mobile-device to the key-box. At step S204 the controller may determine whether the mobile-device has moved beyond a predetermined distance threshold while the key-box is in the opened state. While the determination at step S204 is "NO" the controller may keep monitoring proximity to the mobile-device. If the determination is "YES" at step S204, then at step S206 the controller may cause the mobile-device to interactively communicate with the agent. This interaction may be in the form of an alert which may be a visual, audible and/or vibratory alert. The controller may then perform step S208 of determining whether the mobile-device has returned to a position that is within the threshold distance. So long as the determination at S208 is "NO" the alert may stay active on the mobile-device of the agent. If the determination is "YES" then at step S212 the controller may cause the mobile-device to turn off the alert.

In one embodiment, the key 116 may be equipped with BTLE communication implements 115 as indicated above. In addition to or as an alternate to the features and steps performed in FIG. 6, tracking of proximity of the key 116 may be performed by communications between the key-box 112 and the key 116. Such tracking may be based on periodic BTLE advertisements from the key 116. The lock controller 118 may track the distance to the key 116 as compared with tracking the distance to the mobile-device 124. Alternatively, the mobile-device 124 may determine when it is proximate the key 116 using periodic BTLE advertisements from the key 116. If the key 116 is not in the key-box 112 and the key 116 is not proximate the mobile-device 124, the mobile-device 124, may be disposed to provide the agent with an alert to indicate that the key 116 has been left in an unsecure location. A determination to provide the alert, in this embodiment and in each embodiment provided herein, may be based on instructions from the controller or may be automatically created based on protocols in the App 128 on the mobile-device.

Figure 6A:
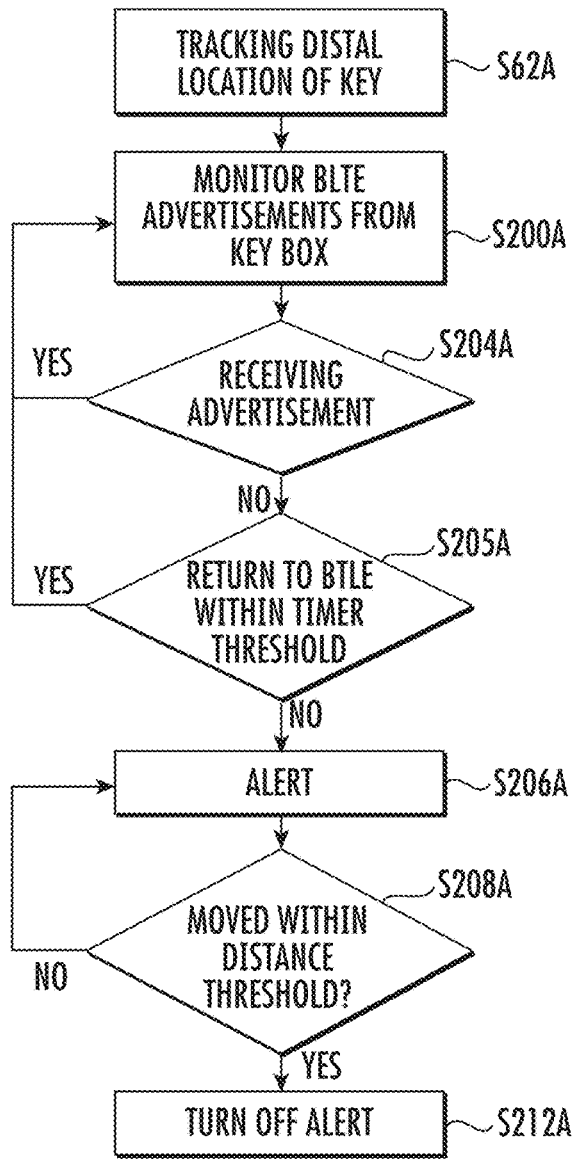

In one embodiment illustrated in FIG. 6A, in addition to or as an alternative of the features and steps disclosed under step S62 in FIG. 6, the mobile-device 124 may perform step S62A in FIG. 6A to determine whether the key 116 is accidentally being removed from the property by the agent 100. At step S200A the mobile-device 124 may listen to a BLTE advertisements from the key-box BTLE transceiver 118 so that the mobile-device may determine a distance to the key-box 112. As long as the mobile-device 124 is within a predetermined range of the key-box 112, and the mobile-device 124 receives the BTLE advertisement from the key-box 112, and the determination is "yes" at step S204A. As a result, no alert may be created by the mobile-device 124.

When the agent with the mobile-device 124 moves outside the range, the determination is "no" at step S204A. At step S205A, a timer may be triggered on the mobile-device 124 for allowing the agent to return within range. When the timer elapses, or if the agent leaves a geofence range around the key-box 112 or property 104, at step S206A the mobile-device 124 may remind the agent with an alert to return to the key-box 112 and return the key 116. If the key-box 112 advertisement indicates the key 116 has been returned or if the agent returns to the threshold zone at step S208A, then the mobile-device 124 may abort this reminder procedure at step S212A.

It is to be appreciated that in such embodiment the APP 128 on the mobile-device 124 may autonomously monitor a distance from itself to the key-box 112. In addition, then the mobile-device 124 may autonomously alert the agent if the agent has been out of range for too long or if the mobile-device 124 has moved too far away. That is, the mobile-device 124 may not need instructions from the key-box 112 in order to create an alert for the agent.

Figure 7:
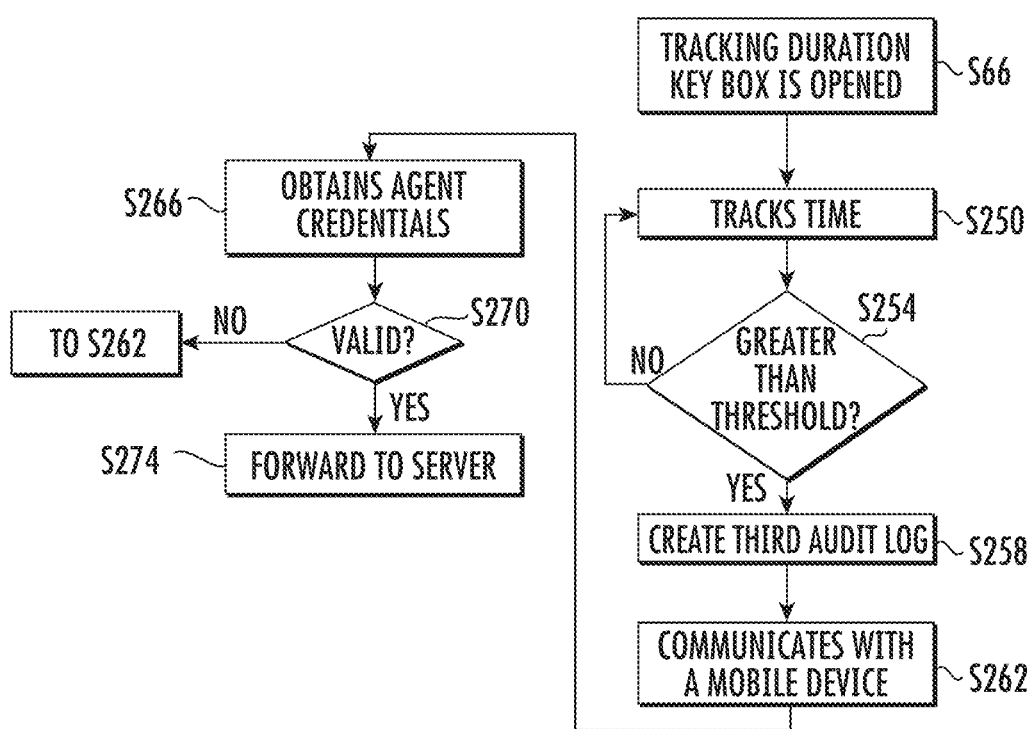
FIG. 7 illustrates a process according to an embodiment of the disclosure.

Referring to FIGS. 2 and 7, as indicated, at step S66 the controller may execute a fourth step of tracking a duration the key-box is opened to identify if the key is potentially lost by the agent. At step S250 the controller may monitor the duration of time, illustrated schematically as an hour glass 212, that the key-box has been in the opened state. At step S254 the controller may determine whether the duration is greater than a predetermined threshold. While the determination is "NO" at step S254, the controller may continue to track the duration of time the key-box is opened. If the determination becomes "YES" then at step S258 the controller may record a third audit log entry indicating that the key-box has been opened for a duration that is greater than the predetermined threshold, indicating the key may be lost by the agent.

At step S262 the controller may communicate with a second mobile-device for a second agent seeking to obtain the key from the key-box. At step S266 the controller may obtain second credentials from the second agent and at step S270 the controller may determine whether the second credentials are valid. If the determination is "YES" then at step S274 the controller may transfer the audit log to the second mobile-device for transferring to the audit log to the central server. If the determination is "NO" then the controller may wait to communicate with another mobile-device for another agent and cycle back to step S262.

The above disclosed embodiments may prompt the agent with a message such as an alert to determine whether a key is inside a key-box before the key-box is closed as the agent leaves the property. The disclosed embodiments may electronically transmit a message, an auditory, vibratory or other typical alert to the agent via the mobile-device for the agent, indicating whether the key is in the key-box. The disclosed embodiments may ensure that the key is replaced in the key-box. In addition, creation of the audit logs may enable tracking of the location of the key and who last used the key.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for monitoring a location of an access key relative to a key box, wherein the key box includes a controller that transmits over a personal area network periodic advertisements of whether the key is in the key box, the system including a mobile device configured to perform steps comprising:
 a first step of monitoring over the personal area network for advertisements,
 a second step of receiving over the personal area network the periodic advertisements from the key box,
 a third step of determining whether the periodic advertisements are indicative of the key being within the key box or removed from the key box;
 wherein
 when the periodic advertisements are indicative of the key being within the key box, the mobile device is configured to return to the first step, and
 when the periodic advertisements are indicative of the key being removed the key box, the mobile device is configured to perform further steps comprising:
 one of a fourth step and a fifth step, wherein:
 the fourth step includes monitoring elapsed time against a predetermined time period and the mobile device is configured to provide an alert when the elapsed time becomes greater than the predetermined time period;
 the fifth step includes monitoring a distance from the key box against a predetermined distance and the mobile device is configured to provide the alert when the distance becomes greater than the predetermined distance; and
 a sixth step of continuing to monitor for transmitted periodic advertisements over the personal area network from the key box and determining whether the periodic advertisements are indicative of the key being within the key box or removed from the key box,
 wherein when the periodic advertisements are indicative of the key being within the key box, the mobile device is configured to discontinue monitoring and to return to the first step.

2. The system of claim 1, wherein following providing the alert, the mobile device is configured to:
 monitor for transmitted periodic advertisements over the personal area network from the key box and determine whether the periodic advertisements are indicative of the key being within the key box or removed from the key box,
wherein
when the periodic advertisements are indicative of the key being within the key box, discontinuing the alert and returning to the first step.

3. The system of claim 1, wherein the personal area network on which the controller transmits the advertisement is Bluetooth.

4. The system of claim 1, wherein the controller is configured to directly detect whether the key is in the key box when advertising whether the key is in the key box.

5. The system of claim 4, wherein the directly detecting is done by the controller in the key box receiving a periodic second advertisement from a chip attached to the access key that transmits over the personal area network the periodic second advertisements.

6. The system of claim 1, wherein
the mobile device performs the fifth step of monitoring the distance from the key box against the predetermined distance, wherein the distance monitoring is based on a geofence range.

7. The system of claim 1, wherein prior to advertising that the key is removed from the key box, the controller obtains credentials from the mobile device for accessing the key, and the controller unlocks the key box upon determining that the credentials are valid, thereby providing access to the key.

8. A system for monitoring a location of an access key relative to a key box, wherein the key box includes a controller that transmits over a personal area network periodic first advertisements,
the system including a chip attached to the access key that transmits over a personal area network periodic second advertisements,
a mobile device configured to perform steps comprising:
a first step of monitoring over the personal area network for advertisements,
a second step of receiving over the personal area network the first and second periodic advertisements,
a third step of determining whether the first and second periodic advertisements are indicative of the key being within the key box or removed from the key box;
wherein
when the determining is indicative of the key being within the key box, the mobile device is configured to return to the first step, and
when the determining is indicative of the key being removed from the key box, the mobile device is configured to perform further steps comprising:
one of a fourth step and a fifth step, wherein:
the fourth step includes monitoring elapsed time against a predetermined time period and the mobile device is configured to provide an alert when the elapsed time becomes greater than the predetermined time period;
the fifth step includes monitoring a distance from the key box against a predetermined distance and the mobile device is configured to provide the alert when the distance becomes greater than the predetermined distance; and
a sixth step of monitoring for transmitted first and second periodic advertisements over the personal area network and determining whether the first and second periodic advertisements are indicative of the key being within the key box or removed from the key box;
wherein
when the monitoring is indicative of the key being within the key box, the mobile device is configured to discontinue monitoring and to return to the first step.

9. The system of claim 8, wherein following providing the alert, the mobile device is configured to:
monitor for transmitted first and second periodic advertisements over the personal area network from the key box and determine again whether the first and second periodic advertisements are indicative of the key being within the key box or removed from the key box,
wherein
when the determine again is indicative of the key being within the key box, discontinuing the alert and returning to the first step.

10. The system of claim 9, wherein when the determine again is indicative of the key being within a different key box, requesting that the agent confirm that the different key box is correct.

11. The system of claim 8, wherein the personal area network on which the controller transmits the advertisement is Bluetooth.

12. The system of claim 8, wherein determining whether the first and second periodic advertisements are indicative of the key being within the key box or removed from the key box is based on proximity.

13. The system of claim 8, wherein the mobile device performs the fifth step of monitoring the distance from the key box against the predetermined distance, wherein the distance monitoring is based on a geofence range.

14. The system of claim 13, wherein prior to a third step of determining whether the first and second periodic advertisements are indicative of the key being within the key box or removed from the key box, the mobile device is configured to:
sending credentials to the controller for accessing the key, wherein the controller unlocks the key box upon determining that the credentials are valid, thereby providing access to the key.

15. The system of claim 14, wherein following the sending credentials, the mobile device is configured to:
determine the geofence range starting from a current location of the mobile device.

16. The system of claim 8, wherein the alert is indicative of the key box.

17. The system of claim 8, wherein the providing an alert includes sending alerts to multiple mobile devices of different agents.

* * * * *